United States Patent Office 2,754,138
Patented July 10, 1956

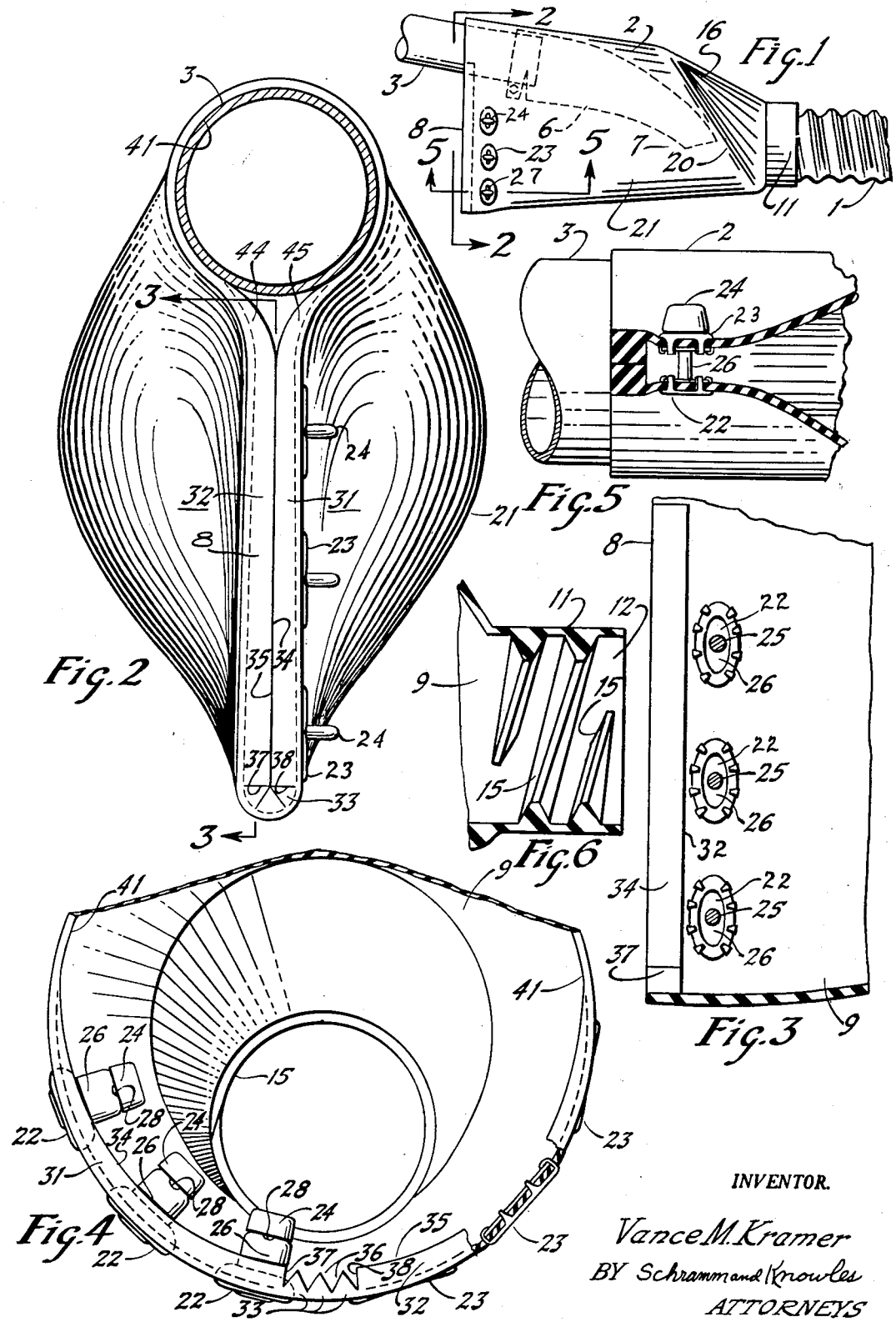

2,754,138

FLEXIBLE ADAPTOR BOOT FOR TUBING FOR CARRYING GASEOUS EXHAUST OF MOTOR VEHICLES

Vance M. Kramer, Shaker Heights, Ohio

Application February 2, 1956, Serial No. 563,096

13 Claims. (Cl. 285—177)

This invention relates to connecting adaptors for flexible tubing of rubber or the like, being more particularly concerned with an improved boot or adaptor device made of flexible and resiliently deformable rubber for attachment of flexible tubing to the exhaust or tailpipe of a motor vehicle to receive and carry off gaseous products of combustion. This invention is an improvement of the adaptor boot disclosed in co-pending application for Letters Patent, Serial No. 256,107, filed November 13, 1951, entitled Flexible Corrugated Tubing Device for Carrying Gaseous Exhaust of Motor Vehicles and Method of Making Same.

The gasoline engines of motor vehicles give off waste gaseous combustion products of a harmful and poisonous nature. So that persons working in garages and repair shops servicing motor vehicles will not be unduly exposed to these harmful exhaust gases, it has been the custom to connect engines of vehicles being serviced to an exhaust conduit system arranged to carry off the gaseous products of combustion for discharge outside the building. Some systems employ a network of conduits submerged in the floor of the garage or service station or suspended overhead, the exhaust or tailpipe of the individual vehicle being connected as required into the conduit network by a short length of flexible tubing. In other arrangements the exhaust from each vehicle is carried through a separate conduit directly to the outside atmosphere, the conduit taking the form of flexible tubing fitted over the end of the tailpipe of the engine and extending through the wall of the building.

Considerable difficulty has been experienced in fitting or adapting flexible conduits to the exhaust or tailpipes of the vehicles. This difficulty stems from variations in sizes and shapes of tailpipes and tailpipe ornaments and deflectors such as are encountered in automobiles of different ages and in different models of automobiles.

The object of the invention is to provide an improved tailpipe adaptor for flexible exhaust tubes which is unbreakable, does not mar or scratch the finish of a car, is light in weight, simple and easily manipulated in mounting on and dismounting from the tailpipe of a car and which incorporates means and is so designed as to effect a good seal as well as to minimize burning of the adaptor by the hot exhaust gases.

In accordance with the present invention, a preferred arrangement comprises a length of laterally bendable or flexible rubber tubing combined with a deformable shape retaining resilient adaptor in such a manner that the tubing or conduit, by means of the adaptor on one end of the tubing, is readily secured to vehicle tailpipes of various shapes and sizes, including those having enlargements or deflectors on their discharge ends, and the joint between the parts is effectively sealed. More specifically, this aspect of the invention is concerned with such an adaptor boot that includes means for receiving and retaining one end of a flexible exhaust conduit and has a relatively large opening or mouth receivable over a vehicle tailpipe deflector, the adaptor including means for progressively closing and effectively sealing the mouth of the boot so as to cause the latter to closely embrace or confine the tailpipe of the vehicle at a point spaced from the discharge end of the tailpipe.

In a simplified form the adaptor is essentially an open-mouthed shape retaining rubber boot capable of being slid endwise over the tailpipe and tailpipe deflector of a motor vehicle by pressure applied at one end of the boot, and which, in combination with a length of flexible corrugated exhaust tubing having one end received in and embraced by the boot, embodies improved means for connecting the tubing to the tailpipe of the vehicle so that, while withstanding normal stresses and strains to which the combination is normally subjected, the parts will readily separate when subjected to extraordinary strain to prevent damage to the adaptor and tubing and to the vehicle to which the device is attached.

A more specific object of the invention is to provide an improved seal at the large end of the adaptor boot between the boot and an engine exhaust pipe which may have a flared deflector received within the boot. To aid in the achievement of this objective, the boot includes an inwardly directed lip, located at the large end opening, the lip having complemental edge surfaces which engage one another to effect a closing seal when the walls of the boot are drawn together. As a refinement of this aspect of the invention, the lip is formed with a central saw-tooth section, that is, a section from which segments of the lip are removed to provide a plurality of inwardly directed teeth which have complemental sealing surfaces. When the walls of the adaptor boot at the end opening are drawn together to effect a seal about an exhaust pipe, the teeth engage one another and form a continuous closure between the collapsed walls at the bottom of the boot end closure.

Fasteners fixed to the walls of the adaptor boot adjacent the large end opening hold the boot in a closed condition and in combination with the lip and tooth surfaces maintain the desired seal at the end opening when a tailpipe is embraced.

A still further object of the invention is to provide an adaptor boot having an inwardly directed end lip which seals without undue distortion of the side walls of the adaptor. The inwardly directed lip limits the amount of distortion required to effect the seal and provide uniform side wall distortion in fitting the adaptor to a tailpipe assembly.

Other objects and advantages relate to certain novel features of construction and combinations and arrangements of parts which obtain simplicity and economy in manufacture, as set forth in the following detailed description made in connection with the accompanying drawings that form part of the specification.

In the drawings:

Fig. 1 is a side elevational view, partly diagrammatic, showing a boot adaptor-flexible conduit device embodying the principles of the present invention, the boot of the device surrounding the flared deflector on the end of the exhaust or tailpipe of an engine or vehicle to receive and carry off gaseous products of combustion;

Fig. 2 is an end view of the adaptor boot taken substantially along the plane indicated by line 2—2 of Fig. 1 and enlarged with respect to that view, showing the adaptor boot closed about the exhaust pipe with the boot walls collapsed together, the complemental elements of the fasteners being interlocked to hold the boot walls together in a closed position and the complemental surfaces of the lip being in engagement to form a seal;

Fig. 3 is a fragmentary sectional view as seen substantially from the plane indicated by line 3—3 of Fig. 2 showing the sealing lip in relation to the fasteners;

Fig. 4 is a fragmentary end elevational view in the scale of Fig. 2, partly in section and with parts broken away and removed showing the boot in its unstressed open condition and the location and relationship of the lip and the fasteners, as seen from the large end of the boot;

Fig. 5 is a fragmentary sectional detail taken substantially on the line 5—5 of Fig. 1 and enlarged with respect to that figure showing the stressed condition of the collapsed side walls which serves to hold the closure flanges or lips in sealing relation; and Fig. 6 is a fragmentary sectional detail, enlarged with respect to Fig. 1, showing the small diameter internally threaded end portion of the boot which yieldably embraces the corrugated flexible tubing.

Generally described, the exhaust gas receiving and conducting device of the present invention, shown in use in Fig. 1, comprises a flexible corrugated rubber conduit or tube 1 and a rubber boot adaptor 2 that is received over tailpipe 3 of a motor vehicle or engine through which are discharged the gaseous products of combustion. The flexible conduit or tube 1 is of any suitable length and may extend to the receiving terminal of a network of permanent exhaust conduits (not shown) or may lead out of the building in which the engine or vehicle is located so as to discharge directly into the outside atmosphere.

The boot or adaptor 2 is made as by molding of a suitable heat and oil resistant rubber or synthetic rubber compound, such as neoprene or a similar synthetic composition. The boot is of elongated character and is circular in cross section, or substantially so, throughout its length, although other cross-sectional shapes may be employed.

The rubber or rubber-like synthetic compound of which the boot is made is sufficiently stiff to impart shape retaining characteristics to the boot so that at normal room temperatures it is substantially self-supporting and does not appreciably collapse of its own weight. The compound selected for use is one of any well known having sufficient toughness and tensile strength to withstand the rough treatment and general abuse to which the device normally is subjected in an automobile garage or repair shop. The shape retaining characteristic of the boot permits it to be held at only one end when sliding it into place over the discharge end of the tailpipe even though the tailpipe of the vehicle may be fitted with a stamped metal deflector 6 having a broad flared outlet end 7. Manipulation of the adaptor boot in fitting it to tailpipes and deflectors of different sizes and shapes is facilitated by walls of tapering thickness. The left hand end (as viewed in Figs. 1 and 3) is formed with or terminates in a relatively large opening 8 through which the tailpipe and deflector are introduced into the internal chamber of the boot. At the end of the adaptor boot opposite the large opening, an integral relatively small diameter cylindrical extension portion 11 has an internal passage or opening 12 that receives an end of the flexible conduit or tube 1, the cylindrical extension embracing the tube end to retain the latter in a frictional grip. The opening or passage 12 is continuous with the main chamber of the adaptor boot so that gases discharged into the main chamber from the tailpipe and deflector 3, 6 of the motor vehicle are conducted or guided by the adaptor walls directly into the conduit 1. Intermediate the ends of the passage 12 the boot end cylindrical portion 11 is formed with an inwardly extending spiral rib or thread 15, which is received matingly within the spiral external groove of the tube 1 in threaded engagement in the provision of a mechanical interlock holding the parts together.

The opening 12 for receiving the flexible conduit or tube 1 is much smaller than the large opening 8 at the opposite end of the boot. By way of example, an adaptor for average garage use may have the outlet opening 12 about 2½ inches in diameter and the large opening 8 about five inches in diameter. The main portion of the internal chamber of the adaptor boot is of substantially uniform cross-sectional area corresponding to the area of the large opening 8 to accommodate the flared ends of tailpipe deflectors inserted into the adaptor. The transition between the main body of the boot and the small end portion 11 is made by a tapered conical portion 16. This conical section of the boot is eccentric to the main or cylindrical portion of the boot, indicated at 21, so that the cylindrical small diameter opening 12 is laterally offset with respect to the large opening 8 and the main portion of the boot chamber. In this offset arrangement of the small outlet opening in the boot, one portion or element of the cylindrical wall 12 of the small opening is substantially flush with one portion or element of the cylindrical wall of the main part 21 of the boot. The offset or eccentric shape permits a more direct flow of the exhaust gases from the deflector 6 into the flexible tube 1 and thereby minimizes objectionable burning of the adaptor 2. The major or main part 21 of the body of the tailpipe adaptor thus comprises a generally cylindrical tube. At one end this tube is open to receive the tailpipe and deflector. At the other or opposite end the tube is integrally jointed along a line indicated at 20 to the conically tapered end portion 16, the conical end being generated about an axis substantially parallel to but laterally offset from the axis of the cylindrical tube portion 21 of the body. The line of intersection indicated at 20 between the cylindrical and conical portions is an ellipse located in a plane disposed at an acute angle to the axis of the cylindrical portion 21 of the adaptor body and also to the axis of the conical tapered portion 16.

As is more fully disclosed in the above-identified copending application for patent, the walls of the adaptor are tapered and have their thickest portions along the line of juncture 20. The small end portion 11 has walls of substantially uniform thickness which are sufficient to support the thread or rib 15 but are thin enough to provide flexibility to permit releasable engagement of the flexible tube 1 which thus permits the boot to separate from the flexible tube in the event that a vehicle to which the boot is attached is driven away without the boot having first been detached from the exhaust pipe.

The device of the present invention is secured over the tailpipe of a motor vehicle by drawing or pinching together the walls of the adaptor boot at or adjacent the end having the large opening 8.

Any suitable means providing progressive securement, such as snap or slide fasteners, may be used for progressively drawing together the walls of the boot and holding them in a collapsed condition. A preferential arrangement incorporates a plurality of fasteners which are affixed to the boot at points along a line adjacent and parallel to the end edge or face 8 of the large generally cylindrical portion 21. The fasteners shown in the drawings comprise a plurality of readily separable interfitting plug and socket elements 22 and 23 fixed to or carried by the boot. The plug elements 22 each have a pivoted end 24 carried by and rotatable on the outer end of a stem 25 (Fig. 3). The stem 25 is carried by and protrudes from a base member 26 as an extension thereof.

When the walls of the adaptor are collapsed together, the plug ends 24 are passed through openings 27 defined by the socket elements 23 and the base members 26 fill such openings. The end elements 24 are then pivoted on the stems 25 approximately 90 degrees from the open position shown in Fig. 4 to the locking positions shown in Figs. 1 and 2. Each of the end members 24 is tensioned against or drawn toward the corresponding base member 26 by a spring (not shown) housed within the base member or spring housing 26 thereby to draw the rotated end member downwardly into a transverse slot 28 (Fig. 4) in the end of the base member 26. The side walls of the boot are thus held together in the positions shown in Figs. 1 and 2.

At its large or open end through which the adaptor receives the tailpipe end and gas deflector, the rubber walls are formed with an integral radially inwardly projecting sealing lip. This lip needs to extend about only the lower portions of the boot opening so that complemental confronting faces 34, 35 of opposite portions 31 and 32 are brought into abutment when the boot walls are collapsed together about a received tailpipe and deflector. The upper portions of the boot walls closely embrace the cylindrically shaped tailpipe so that the sealing lip is unnecessary and may be omitted. The upper end sections of the lip portions 31 and 32 are tapered in height as shown at 44 and 45 to effect a transition between the lipped and unlipped 41 portions of the boot end opening, thereby enabling the boot to accommodate tailpipes of different diameter conveniently. When the boot is collapsed and its walls held together by the fasteners, the faces 34, 35 of the sealing lip portions are together in a vertical axial plane (the plane of Fig. 3) about which the lip is symmetrical.

Inwardly directed V-shaped teeth 33 of a central toothed section of the lip have angularly disposed surfaces 36 and the lip portions 31 and 32 have end faces 37 and 38, respectively. When the boot is collapsed about a tailpipe, as shown, the surfaces 36 of the central tooth are engaged by the confronting surfaces of the adjacent teeth in intersecting planes represented by meeting lines 48 (Fig. 2) and the inclined surfaces 36 of the end teeth are engaged by the confronting end surfaces 37, 38 of the rib portions 31, 32 in intersecting planes represented by meeting lines 49 (Fig. 2).

The tooth surfaces 36 and the lip end surfaces 37 and 38 thus engage one another to form a semi-circular closure at the bottom of the end seal.

The toothed central section has three of the teeth 33, each of which is formed symmetrically about a radial plane. The tooth surfaces 36 lie in planes which intersect the radial planes, at angles of approximately 30 degrees. Thus in the unstressed condition of the boot, the toothed central section of the lip has a plurality of V-shaped notches or openings defined by the lip end surfaces 37 and 38 by the intersecting tooth surfaces 36.

When the side walls of the adaptor are collapsed together and the various complemental surfaces of the radial lip are in engagement, forming an end seal as shown in Fig. 2, the end opening is thus divided into a lipped part and a non-lipped part 41, the non-lipped part being the part of the opening which surrounds and embraces the tailpipe 3 in the provision of a circumferential seal with such tailpipe.

Thus through the provision of an inwardly directed lip, an improved seal is obtained about the end opening of the boot.

The present invention accordingly provides, in combination, an adaptor boot of shape retaining molded rubber composition having a relatively large end opening, a plurality of fasteners adjacent such opening, and an inwardly directed lip along the edge of such opening for effecting a seal. The present device will efficiently and in a practical manner connect a flexible tube to an internal combustion exhaust pipe (which latter may have a flared end gas deflector) to transmit exhaust gases emitted from such exhaust pipe away from the vicinity of the engine.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim and desire to secure by Letters Patent of the United States is:

1. An adaptor for connecting flexible tubing to the tailpipe and flared deflector of an engine exhaust system, said adaptor comprising a resilient deformable tubular molded rubber body open at both ends and having shape retaining stiffness, the body being of substantially cylindrical form over the major portion of its length providing a relatively large internal chamber for receiving the tailpipe deflector, one end of the body having a relatively large opening into said chamber which large opening is substantially equivalent in cross-sectional area to the maximum cross-sectional area of the chamber, the other end of the body having a smaller opening continuous with the internal chamber, said other end having means for receiving and retaining the end of the flexible tubing to be connected to the tailpipe, the body being formed with inwardly directed integral sealing lip means extending around the major portion of the opening into the chamber at said one end of the body, said lip means including complemental portions disposed to be brought into edgewise sealing abutment with one another upon collapsing together of portions of the body adjacent said one end opening, and means carried by the body adjacent said one end opening to releasably hold portions of the adaptor body at said one end collapsed together to reduce the effective area of said one end opening.

2. An adaptor for connecting flexible tubing to the tailpipe and flared deflector of an engine exhaust system, said adaptor comprising a resilient deformable tubular molded rubber body open at both ends and having shape retaining stiffness, the body being of substantially cylindrical form over the major portion of its length providing a relatively large internal chamber for receiving the tailpipe deflector, one end of the body having a relatively large opening into said chamber which large opening is substantially equivalent in cross-sectional area to the maximum cross-sectional area of the chamber, the other end of the body having a smaller opening continuous with the internal chamber, said other end having means for receiving and retaining the end of the flexible tubing to be connected to the tailpipe, the body being formed with inwardly directed integral sealing lip means extending around the major portion of the opening into the chamber at said one end of the body, said lip means including a toothed portion having teeth with complemental side faces adapted to be brought into sealing engagement with one another upon formation of a reverse bend in the body adjacent such toothed portion of the lip means, and means carried by the body adjacent said one end opening to releasably hold portions of the adaptor body at said one end collapsed together to reduce the effective area of said one end opening.

3. An adaptor for connecting flexible tubing to the tailpipe and flared deflector of an engine exhaust system, said adaptor comprising a resilient deformable tubular molded rubber body open at both ends and having shape retaining stiffness, the body being of substantially cylindrical form over the major portion of its length providing a relatively large internal chamber for receiving the tailpipe deflector, one end of the body having a relatively large opening into said chamber which large opening is substantially equivalent in cross-sectional area to the maximum cross-sectional area of the chamber, the other end of the body having a smaller opening continuous with the internal chamber, said other end having means for receiving and retaining the end of the flexible tubing to be connected to the tailpipe, the body being formed with inwardly directed integral sealing lip means extending around the major portion of the opening into the chamber at said one end of the body, said lip means including complemental portions disposed to be brought into edgewise sealing abutment with one another upon collapsing together of portions of the body adjacent said one end opening, said lip also including a toothed portion intermediate said complemental portions, said toothed portions of the lip having teeth with complemental side faces adapted to be brought into sealing engagement with one another upon formation of a reverse bend in the body adjacent the toothed portion of the lip means, and means carried by the body adjacent said one end opening to releasably hold portions of the adaptor body at said one end collapsed together to reduce the effective area of said one end opening.

4. An adaptor for connecting flexible tubing to the tailpipe and flared deflector of an engine exhaust system, said adaptor comprising a resilient deformable tubular molded rubber body open at both ends and having shape retaining stiffness, the body being of substantially cylindrical form over the major portion of its length providing a relatively large internal chamber for receiving the tailpipe deflector, one end of the body having a relatively large opening into said chamber which large opening is substantially equivalent in cross-sectional area to the maximum cross-sectional area of the chamber, the other end of the body having a smaller opening continuous with the internal chamber, said other end having means for receiving and retaining the end of the flexible tubing to be connected to the tailpipe, the body being formed with inwardly directed integral sealing lip means extending around the major portion of the opening into the chamber at said one end of the body, said lip means including complemental portions disposed to be brought into edgewise sealing abutment with one another upon collapsing together of portions of the body adjacent said one end opening, and fasteners each comprising separable elements carried by the body adjacent the lip means to releasably hold portions of the adaptor body at said one end collapsed together to reduce the effective area of said one end opening, the elements of each fastener when coupled together holding confronting portions of the body closer than required to effect contact between the complemental portions of the lip means whereby to bow such confronting body portions so that the stress in the bowed body portions yieldingly maintains the sealing abutment between the complemental portions of the lip means when the body is subjected to such incidental twisting and bending as occurs in normal use.

5. An adaptor for connecting flexible tubing to the tailpipe and flared deflector of an engine exhaust system, said adaptor comprising a resilient deformable tubular molded rubber body open at both ends and having shape retaining stiffness, the body being of substantially cylindrical form over the major portion of its length providing a relatively large internal chamber for receiving the tailpipe deflector, one end of the body having a relatively large opening into said chamber which large opening is substantially equivalent in cross-sectional area to the maximum cross-sectional area of the chamber, the other end of the body having a smaller opening continuous with the internal chamber, said other end having means for receiving and retaining the end of the flexible tubing to be connected to the tailpipe, the body being formed with inwardly directed integral sealing lip means extending around the major portion of the opening into the chamber at said one end of the body, said lip means including complemental portions disposed to be brought into edgewise sealing abutment with one another upon collapsing together of portions of the body adjacent said one end opening, said lip also including a toothed portion intermediate said complemental portions, said toothed portions of the lip having teeth with complemental side faces adapted to be brought into sealing engagement with one another upon formation of a reverse bend in the body adjacent the toothed portion of the lip means, and fasteners each comprising separable elements carried by the body adjacent the lip means to releasably hold portions of the adaptor body at said one end collapsed together to reduce the effective area of said one end opening, the elements of each fastener when coupled together holding confronting portions of the body closer than required to effect contact between the complemental portions of the lip means whereby to bow such confronting body portions so that the stress in the bowed body portions yieldingly maintains the sealing abutment between the complemental portions of the lip means when the body is subjected to such incidental twisting and bending as occurs in normal use.

6. An adaptor for connecting flexible tubing to a flared deflector and tubular tailpipe of an engine exhaust system, said adaptor comprising a resilient deformable tubular open-ended body, said body having at one end, a relatively small substantially cylindrically shaped tubular portion and at the other end, a relatively large substantially cylindrically shaped tubular portion having collapsible side walls, the relatively large body portion being receivable over the deflector and tailpipe and the small body portion being adapted to receive and retain one end of the flexible tubing to be connected, the body having an inwardly directed integral lip at and defining a lower portion of the opening at said other end, such opening having an upper portion defined by a non-lipped part of the body, the non-lipped part being adapted by flexibility to peripherally embrace a tailpipe, the lip being symmetrical about an axial plane through the tubular body and having a pair of end sections and a central toothed section, the lip end sections having inwardly directed complemental surfaces and the lip toothed section having a plurality of teeth having complemental surfaces to contact one another in the formation of a closing seal when the walls of the large portion of the body are collapsed together at the opening and a tailpipe is embraced by the non-lipped part, and means fixed to said adaptor to releasably hold the adaptor in peripheral embracing relationship to an engine tailpipe with the adaptor walls collapsed together and to hold the complemental surfaces of the end and toothed sections of the lip in contact with one another in the formation of such closing seal, whereby the adaptor is arranged to receive a flared deflector within the large portion and the complemental surfaces of the rib are held in engagement with one another.

7. An adaptor for connecting flexible tubing to a flared deflector and tubular tailpipe of an engine exhaust system, said adaptor comprising a resilient deformable tubular open-ended body, said body having at one end a relatively small substantially cylindrical portion and at the other end a relatively large substantially cylindrical portion having collapsible side walls, the relatively large portion of the body being receivable over the deflector and tailpipe and the small body portion being adapted to receive and retain one end of the flexible tubing to be connected, the body having an inwardly directed integral lip at said other end, the lip having end sections and a central toothed section, the lip end sections terminating at a non-lipped margin of the large portion of the body and having inwardly directed complemental surfaces, the lip toothed section having a plurality of teeth having complemental surfaces to contact one another in the formation of a closing seal when the walls of the large portion of the body are collapsed together about an embraced tailpipe, said lip end sections having remote end portions of decreasing radial dimension toward the non-lipped margin of the body and means fixed to said adaptor to releasably hold the adaptor in peripheral embracing relationship about a received engine tailpipe and to hold the complemental surfaces of the end and toothed sections of the lip in contact with one another in the formation of a seal.

8. An adaptor for connecting flexible tubing to a flared deflector and tubular tailpipe of an engine exhaust system, said adaptor comprising a resilient deformable tubular open-ended body receivable one end over the deflector and tailpipe and another end over the flexible tubing to be connected, the body having an inwardly directed integral lip at and defining the opening at said one end, the lip having a pair of end sections tapered in radial height and a central section, the lip sections having inwardly directed complemental rib surfaces to contact one another in the formation of a closing seal when the walls of the body are collapsed together about a tailpipe, and means fixed to said adaptor to releasably hold the adaptor in embracing relationship about a tailpipe and the complemental rib surfaces in engagement with one another.

9. An adaptor for connecting flexible tubing to a flared deflector and tubular tailpipe of an engine exhaust system, said adaptor comprising a resilient deformable tubular open-ended body, said body having at one end a relatively large substantially cylindrical portion having collapsible side walls, the relatively large body portion being receivable over the deflector and tailppipe and the small body portion being adapted to receive and retain one end of the flexible tubing to be connected, the body having an inwardly directed integral lip at and defining the lower portion only of the opening at said other end and providing such opening with lower lipped and upper non-lipped parts, the lip having a pair of end sections and a central toothed section, the lip end sections having inwardly directed complemental surfaces and the lip toothed section having a plurality of teeth having complemental intersecting side surfaces adapted to contact one another in the formation of a closing seal when the walls of the large portion of the body are collapsed together and a tailpipe is embraced by the non-lipped part, the lipped part including when the large end opening is closed about a tailpipe a section housing substantially uniform transverse dimension from top to bottom, and the lipped part also including when the large end opening is closed about a tailpipe an arcuately curved section formed by the toothed central section at the bottom of the uniform transverse dimension section.

10. An adaptor boot for connecting the flared deflector and tailpipe of an internal combustion engine to a flexible tube, said boot comprising a tubular body having resiliently collapsible walls and openings at opposite ends, the body having a large substantially cylindrical portion at one end and a small substantially cylindrical portion at the other end, the opening at the one end being to receive the flared deflector, the opening at the other end being to receive the flexible tube, the body having an inwardly directed lip at the one end opening dividing such opening into lipped and non-lipped parts, the lip having end sections and a central toothed section having complemental surfaces engageable with one another upon collapsing of the walls of the body at said one end to provide a seal at said one end, and fasteners having complemental elements fixed to the walls adjacent said one end opening, said complemental elements being engageable to hold the body walls collapsed behind the received deflector and said lip complemental surfaces together to maintain the seal at said one end opening and to hold the boot closed snugly about the tailpipe and the flared deflector.

11. An adaptor for connecting flexible tubing to the flared deflector and tubular tailpipe of an engine exhaust system, said adaptor comprising a resilient deformable tubular open-ended body, said body having at one end a relatively large substantially cylindrical portion having collapsible side walls and at the other end a relatively small substantially cylindrical portion, the relatively large body portion being receivable over the deflector and tailpipe and the small body portion being adapted to receive and retain one end of the flexible tubing to be connected, the body having an annular end edge defining the opening into the interior of the adaptor at said one end, the end edge being formed with an inwardly directed integral lip at and extending around the lower portion only of the opening at said one end whereby to divide the end edge into lipped and non-lipped parts, the lip having end sections and a central section, the lip end sections having inwardly directed complemental surfaces and the lip central section having a plurality of inwardly projecting V-shaped teeth, said teeth having complemental surfaces to contact one another sealingly when the walls of the large portion of the body are collapsed, the teeth being of the same radial height as the inwardly directed lip end sections, the lipped part of the end edge, when the large end opening is closed about a tailpipe, having the complemental surfaces of the lip end sections disposed together in sealing relation and forming on said one end of the adaptor a closed end face of several times greater height than width and substantially uniform in transverse dimension, the lipped part of the end edge also forming when closed a substantially semi-circular end face at the bottom defined by the toothed central section, and means fixed to the side walls to releasably hold the upper non-lipped part of the end edge in embracing relationship about an engine tailpipe and to hold the complemental surfaces of the end and toothed sections of the lip in contact with one another.

12. An adaptor for connecting flexible tubing to the tailpipe of an engine, said adaptor comprising a hollow body of resilient shape retaining deformable material having at one end a relatively large normally circular opening to receive the tailpipe and at the other end having means for connecting flexible tubing to the body in communication with the interior, the body walls at said one end adjacent the large opening being deformable so that some portions of the body walls can be made to closely embrace a received tailpipe and the other portions can be flattened together along a parting line whereby to reduce the size of the opening to correspond approximately to the size of the received tailpipe, an integral rib formed on the body walls at said one end and in the normal unstressed condition of the adaptor projecting radially into the opening through which the tailpipe is received, said rib constituting a filler in the end opening of the body which limits the collapsing together of said other portions of the walls of the body and provides a seal along the parting line in that portion of the opening not occupied by the received tailpipe, and means for holding the said other portions of the body walls together in collapsed relation to retain the adaptor body about a received tailpipe with the rib sealing the parting line.

13. An adaptor for connecting flexible tubing to the tailpipe of an engine, said adaptor comprising a hollow body of resilient shape retaining deformable material having at one end a relatively large normally circular opening to receive the tailpipe and at the other end having means for connecting flexible tubing to the body in communication with the interior, the body walls at said one end adjacent the large opening being deformable so that some portions of the body walls can be made to closely embrace a received tailpipe and other portions can be flattened together along a parting line whereby to reduce the size of the opening to correspond approximately to the size of the received tailpipe, an integral rib formed on the body walls at said one end and in the normal unstressed condition of the adaptor projecting radially into the opening through which the tailpipe is received, said rib constituting a filler in the end opening of the body which limits the collapsing together of said other portions of the walls of the body and provides a seal along the parting line in that portion of the opening not occupied by the received tailpipe, and means carried by the walls of the body along a line spaced inwardly from and paralleling the rib to hold the walls together in collapsed relation, said holding means being arranged to retain the body walls stressed beyond the limit required to establish a seal along the rib whereby the inherent resiliency of the body walls yieldingly maintains the parting line seal.

References Cited in the file of this patent
UNITED STATES PATENTS
2,522,630    McCulloch _____ Sept. 19, 1950